(12) United States Patent
Allalouf et al.

(10) Patent No.: US 9,324,527 B2
(45) Date of Patent: Apr. 26, 2016

(54) ARC MONITOR

(75) Inventors: Shlomy Allalouf, Vasteras (SE); Leif Nilsson, Vasteras (SE); Asa Gronqvist, Vasteras (SE); Goran Engblom, Vasteras (SE); Sigvard Mattsson, Västerås (SE)

(73) Assignee: ABB Technology Ltd, Zurich (CH)

( * ) Notice: Subject to any disclaimer, the term of this patent is extended or adjusted under 35 U.S.C. 154(b) by 605 days.

(21) Appl. No.: 12/576,042

(22) Filed: Oct. 8, 2009

(65) Prior Publication Data

US 2010/0085671 A1    Apr. 8, 2010

(30) Foreign Application Priority Data

Oct. 8, 2008   (EP) .................................... 08166064

(51) Int. Cl.
| | |
|---|---|
| *H02H 3/16* | (2006.01) |
| *H01H 71/02* | (2006.01) |
| *H02H 1/00* | (2006.01) |
| *H01H 71/00* | (2006.01) |

(52) U.S. Cl.
CPC ......... *H01H 71/0264* (2013.01); *H02H 1/0015* (2013.01); *H02H 3/16* (2013.01); *H01H 2071/006* (2013.01); *H02H 1/0023* (2013.01)

(58) Field of Classification Search
CPC ..... H02H 1/0015; H02H 3/338; H02H 3/335; H02H 3/33; H02H 1/0023; H02H 3/16; H01H 83/04; H01H 71/0264; H01H 2071/006
USPC .......................................................... 361/42
See application file for complete search history.

(56) References Cited

U.S. PATENT DOCUMENTS

| | | | | |
|---|---|---|---|---|
| 4,536,126 | A * | 8/1985 | Reuther | 290/40 R |
| 4,658,322 | A * | 4/1987 | Rivera | 361/37 |
| 4,940,933 | A * | 7/1990 | Jenkins | 324/765.01 |
| 5,825,598 | A * | 10/1998 | Dickens et al. | 361/42 |
| 6,990,393 | B2 * | 1/2006 | Parker | 700/282 |
| 2003/0048589 | A1* | 3/2003 | Tignor et al. | 361/93.3 |
| 2008/0192389 | A1 | 8/2008 | Muench et al. | |
| 2010/0073831 | A1* | 3/2010 | Schweitzer, III | 361/42 |

FOREIGN PATENT DOCUMENTS

| | | |
|---|---|---|
| CN | 201018218 Y | 2/2008 |
| CN | 101141061 A | 3/2008 |

(Continued)

OTHER PUBLICATIONS

European Search Report; EP 08 16 6064; Feb. 24, 2009; 8 pages.

*Primary Examiner* — Zeev V Kitov
(74) *Attorney, Agent, or Firm* — Whitmyer IP Group LLC (57) ABSTRACT

An arc monitor for tripping a circuit breaker in the event of an arc occurrence, the arc monitor including at least one arc detector and arranged to be operatively connected to at least one circuit breaker. The arc monitor includes a base unit and at least one extension unit with at least one arc detector input terminal, the at least one arc detector being connectable to the at least one arc detector input terminal, and the base unit includes a control unit. The extension unit is operatively connectable to and arranged to send an arc occurrence signal to the control unit, which is arranged to send a trip signal for tripping the at least one circuit breaker, in the event of an arc occurrence. Also an electrical installation including an arc monitor, and the use of an arc monitor as a supervision and safety equipment in an electrical installation.

29 Claims, 4 Drawing Sheets

(56) References Cited

FOREIGN PATENT DOCUMENTS

| | | | |
|---|---|---|---|
| DE | 4440281 A1 | 5/1996 |
| DE | 102007001143 A1 | 10/2007 |
| WO | 8808217 A1 | 10/1988 |
| WO | 2007136836 A2 | 11/2007 |

* cited by examiner

ARC MONITOR

CROSS-REFERENCE TO RELATED APPLICATIONS

The present application claims priority of European patent application No. 08166064.9 filed on Oct. 8, 2008, the content of which is incorporated herein by reference.

FIELD OF THE INVENTION

The present invention relates generally to the field of supervision and safety equipment for low, medium and high voltage electrical installations, such as switchgears or industrial electrical installations. Moreover, the present invention relates specifically to the field of arc monitors, arranged to trip a circuit breaker in the event of an arc occurrence, e.g. in a switchgear. The arc monitor comprises at least one arc detector and is arranged to be operatively connected to at least one circuit breaker.

The invention also relates to an electrical installation comprising such an arc monitor, as well as to the use of such an arc monitor as a supervision and safety equipment in an electrical installation.

BACKGROUND OF THE INVENTION

A short circuit in low, medium and high voltage applications, such as switchgears and industrial electrical installations, is typically accompanied by the occurrence of an electric arc. An arc occurrence always leads to considerable damages to equipment and if people are present at the time of arcing they run the risk of getting severe or lethal injuries, unless the arc is extinguished very fast.

It is known to arrange supervision and safety equipment in electrical installations in the form of an arc monitor. The object of the arc monitor is to prevent or limit the damages to equipment and people in the event of an arc occurrence, by tripping the circuit breaker of the switchgear within a couple of milliseconds from the formation of the arc. In order to identify the occurrence of an arc the arc monitor comprises a number of arc detectors, which are to be located at suitable locations within the electrical installation wherever arcing is likely to occur.

A short circuit may for instance happen as a consequence of a mistake or an accident when an operator drops a tool on, or forgets a tool abutting, live parts of the switchgear, or as a consequence of bad electric connection which may lead to heat and spark formation, or as a consequence of animals finding their way into the switchgear and causing a short circuit by contacting live parts.

Upon such cases, when an arc occur, the arc monitor is arranged to quickly trip e.g. the main circuit breaker of the switchgear, in order to shorten the burning time of the arc. Thereby the risk of damages to equipment and people is prevented or limited, and the accessibility to the switchgear for the maintenance personnel is increased, such that the break down may be taken care of as quick as possible. Thus, the short circuiting tool or animal may be removed, or the loose screw may be fastened.

A conventional arc monitor comprises a fixed number of arc detector input terminals, e.g. ten, and may thus only be equipped with the same number of arc detectors. If the electrical installation, in which the supervision and safety equipment is arranged, is of considerable size more than ten arc detectors may be needed. This means that several arc monitors must be used to cover the entire electrical installation, which arc monitors are connected to the circuit breaker in parallel with each other. The use of several arc monitors is space requiring and the total cost is unnecessary high. In addition, a conventional arc monitor is only operatively connected to a single circuit breaker, usually the main circuit breaker of the electrical installation, e.g. of the switchgear. In electrical installations of considerable size, e.g. an installation having a number of separate compartments having separate or shared sub circuit breakers, it is sometimes unneeded to shut down the entire electrical installation in the event of an arc occurrence in one of the compartments. It is a problem that operational disturbances will unnecessarily affect customers/users if the entire electrical installation is shut down. In addition, after a total shut down, an electrical installation of considerable size may need days before full electrical load may be taken out from the electrical installation, i.e. the electrical load must be ramped up, which will further affect the customers/users that were already from the beginning unnecessarily affected. If a separate or shared sub circuit breaker of a compartment of an electrical installation is required to be separately controlled, conventionally a separate arc monitor must be dedicated that task, even though only a few arc detectors of that arc monitor is needed and/or used to supervise said compartment. This entails that much of the equipment is unutilized.

The present invention aims at obviating the aforementioned disadvantages of previously known arc monitors, and at providing an improved arc monitor. A primary object of the present invention is to provide an improved arc monitor of the initially defined type that may be adapted for the needs of the specific electrical installation.

It is another object of the present invention to provide an arc monitor, which is less space requiring in large electrical installations.

It is another object of the present invention to provide an arc monitor, which is less expensive than conventional arc monitor solutions when used in large electrical installations. It is yet another object of the present invention to provide an arc monitor, to which different types of arc detectors may be connected. It is also an object of the present invention to provide an arc monitor, the function and status of which may be tested and checked remotely.

SUMMARY OF THE INVENTION

According to the invention at least the primary object is attained by means of the initially defined arc monitor, the electrical installation comprising such an arc monitor, and the use of an arc monitor as a supervision and safety equipment, having the features defined in the independent claims. Preferred embodiments of the present invention are further defined in the dependent claims.

According to a first aspect of the present invention, there is provided an arc monitor of the initially defined type, which is characterized in that the arc monitor comprises a base unit and at least one extension unit, the extension unit comprises at least one arc detector input terminal, said at least one arc detector being connectable to said at least one arc detector input terminal, and said base unit comprises a control unit, in addition the extension unit is operatively connectable to and arranged to send an arc occurrence signal to said control unit, which is arranged to send a trip signal for tripping said at least one circuit breaker, in the event of an arc occurrence.

According to a second aspect of the present invention, there is provided an electrical installation comprising at least one circuit breaker and an arc monitor of the initially defined type, which is characterized in that the arc monitor comprises at least one arc detector and is operatively connected to the at least one circuit breaker, characterized in that the arc monitor comprises a base unit and at least one extension unit, the extension unit comprises at least one arc detector input terminal, said at least one arc detector being connectable to said at least one arc detector input terminal, and said base unit comprises a control unit, in addition the extension unit is operatively connectable to and arranged to send an arc occurrence signal to said control unit, which is arranged to send a trip signal for tripping said at least one circuit breaker, in the event of an arc occurrence.

According to a third aspect of the present invention, there is provided an use of an arc monitor as a supervision and safety equipment in an electrical installation.

Thus, the present invention is based on the insight that the concept of making an arc monitor out of modules will save space and costs, and will admit a more adaptable supervision and safety equipment for the specific electrical installation. Thus, the use of a base unit comprising all the necessary components to examine whether an arc has occurred, and to send a trip signal to the circuit breaker in question, and the use of one or more extension units comprising arc detectors, of the same or different types, is a requirement for one and the same arc monitor to be used for small and large electrical installation, and for electrical installations of different types, and which will still provide adapted and adequate protection for the specific electrical installation.

In a preferred embodiment of the present invention, the at least one extension unit comprises a programmable logic circuit arranged to convert an arc detector signal from the arc detector into an arc occurrence signal, said arc occurrence signal being linked to said arc detector input terminal. This means that the control unit of the base unit may receive information which of the arc detectors that has detected the arc.

In a preferred embodiment of the present invention, the control unit of the base unit is arranged to record the arc occurrence signal from the extension unit and to send a trip signal for tripping the at least one circuit breaker operatively linked to the specific arc detector input terminal, in the event of an arc occurrence. This means that the control unit of the base unit may determine which of the arc detectors that has detected the arc, and thus trip the circuit breaker concerned.

In a preferred embodiment of the present invention, the base unit comprises at least one arc detector input terminal of the base unit, to which an arc detector is connectable. This means that the base unit comprises arc detector input terminals of its own and may thus be used without any extension units. In addition, said arc detector input terminal of the base unit is operatively connected to the control unit, which is arranged to record an arc detector signal from the arc detector and to send a trip signal for tripping the at least one circuit breaker operatively linked to the arc detector input terminal, in the event of an arc occurrence. This means that the control unit of the base unit is arranged to both receive arc detector signals from arc detectors connected to the arc detector input terminals of the base unit and arc occurrence signals from arc detectors connected to the arc detector input terminals of the extension unit.

According to a preferred embodiment, each arc detector is arranged to detect a temperature above a predetermined level, or the presence of smoke, or a pressure difference greater than a predetermined amount, or an emitted light above a predetermined intensity. This means that the arc monitor may detect an arc occurrence by different physical phenomenon in order to detect the most suitable physical phenomenon at the location of the specific arc detector. Thereto, in order to prevent false alarm different types of arc detectors may be used in the same area of the electrical installation such that at least two different physical phenomenon related to an arc occurrence are detected.

In a preferred embodiment of the present invention, the arc monitor comprises a control panel operatively connected to the control unit of the base unit. Thereby the status of the arc monitor may be tested and checked without the use of any peripheral equipment, such as a computer. In addition said control panel may comprise a primary control panel releasably connected to the base unit and a secondary control panel arranged remote from said base unit, which result in that the function of the arc monitor may be tested by use of the secondary control panel before entering the electrical installation in question.

According to a preferred embodiment, the arc monitor has a default operation mode, during which the base unit is arranged to be operatively connected to said at least one circuit breaker, and a temporary test mode, during which the base unit is arranged to be operatively disconnected from the at least one circuit breaker for a period of time less than 100 milliseconds, the arc monitor comprising at least one arc detector and an arc detector tester comprising at least one artificial arc emitting means, the arc detector being exposable to an artificial arc emitted from said arc detector tester during the temporary test mode in order to test the function of the arc detector, wherein the control unit of the base unit is arranged to examine whether the emitted artificial arc is detected by the at least one arc detector and recorded in said control unit. This means that the function of the arc monitor may be tested according to a schedule or manually, in order to get an indication whether the arc monitor is functioning adequately or needs maintenance.

BRIEF DESCRIPTION OF THE DRAWINGS

A more complete understanding of the abovementioned and other features and advantages of the present invention will be apparent from the other dependent claims as well as from the following detailed description of preferred embodiments in conjunction with the appended drawings, wherein:

DETAILED DESCRIPTION OF THE INVENTION

In the FIGS. 1-4 is schematically disclosed an inventive arc monitor, generally designated 1. The main object of the inventive arc monitor 1 is to work as a supervision and safety equipment for low, medium or high voltage electrical installations, such as a switchgear or an industrial electrical installation, generally designated 2. The arc monitor 1 is operatively connected to and arranged to trip at least one circuit breaker 3, 3' in the event of an arc occurrence, e.g. the main circuit breaker 3 on a supply main of a switchgear 2 and/or a sub circuit breaker 3' arranged in one compartment or responsible for a part of the switchgear 2, in order to prevent further energy from reaching the arc and thereby the arc is extinguished. It should be pointed out that the arc monitor 1 comprises all the hardware and software that are necessary to perform the different functions described in this document.

The parts that are not explicitly described herein are considered obvious for the skilled person within the art.

The inventive arc monitor 1 comprises a base unit 4, an extension unit 5 and at least one arc detector 6. In the shown embodiment the arc monitor 1 comprises two extension units 5 and a control panel, generally designated 7. Each extension unit 5 comprises at least one arc detector input terminal 8, usually ten or more, each arranged to receive one arc detector 6. Further, the extension unit 5 comprises a programmable logic circuit (not shown), or the like, capable of performing the act to convert an arc detector signal from the arc detector 6, as a result of the event of an arc occurrence, which arc detector 6 is connected to a specific arc detector input terminal 8, into an arc occurrence signal. Said arc occurrence signal is preferably linked to said specific arc detector input terminal 8. The link between a specific arc occurrence signal and a specific arc detector input terminal 8, may be realize either by electronically label said arc occurrence signal or by dedicating a specific output terminal 9, i.e. a specific pin of a set of output terminals 9, of the extension unit 5 to each arc detector input terminal 8 of the extension unit 5.

The base unit 4 comprises a control unit (not shown) which is operatively connectable to each extension unit 5, the latter is arranged to send the arc occurrence signal to said control unit. The control unit is arranged to record the arc occurrence signal from the extension unit 5 and send a trip signal for tripping the specific circuit breaker 3, 3' that is operatively linked to the specific arc detector input terminal 8, which is linked to the specific arc occurrence signal.

In a preferred embodiment, the base unit 4 comprises at least one arc detector input terminal 8' of the base unit 4, to which an arc detector 6 may be connected. Said arc detector input terminal 8' of the base unit 4 is operatively connected to the control unit of the base unit 4. The control unit of the base unit 4 is arranged to record an arc detector signal from the arc detector 6, connected to the arc detector terminal 8' of the base unit 4, as a result of the event of an arc occurrence. The base unit 4 may comprise a programmable logic circuit (not shown), or the like, capable of performing the act to convert an arc detector signal from the arc detector 6, as a result of the event of an arc occurrence, which arc detector 6 is connected to a specific arc detector input terminal 8' of the base unit 4, into an arc occurrence signal. Thus, this may be compared with an extension unit that is build-in in the base unit 4. Said arc detector signal or arc occurrence signal is preferably linked to said specific arc detector input terminal 8' of the base unit 4. The link between a specific arc detector signal or arc occurrence signal and a specific arc detector input terminal 8' of the base unit 4, may be realize either by electronically label said arc detector signal or arc occurrence signal or by dedicating a specific input terminal of the control unit of the base unit 4 to each arc detector input terminal 8' of the base unit 4. In addition, the control unit of the base unit 4 is arranged to send a trip signal for tripping the circuit breaker 3, 3' that is operatively linked to the specific arc detector input terminal 8' of the base unit 4, which is linked to the specific arc detector signal or arc occurrence signal.

Figure 1:
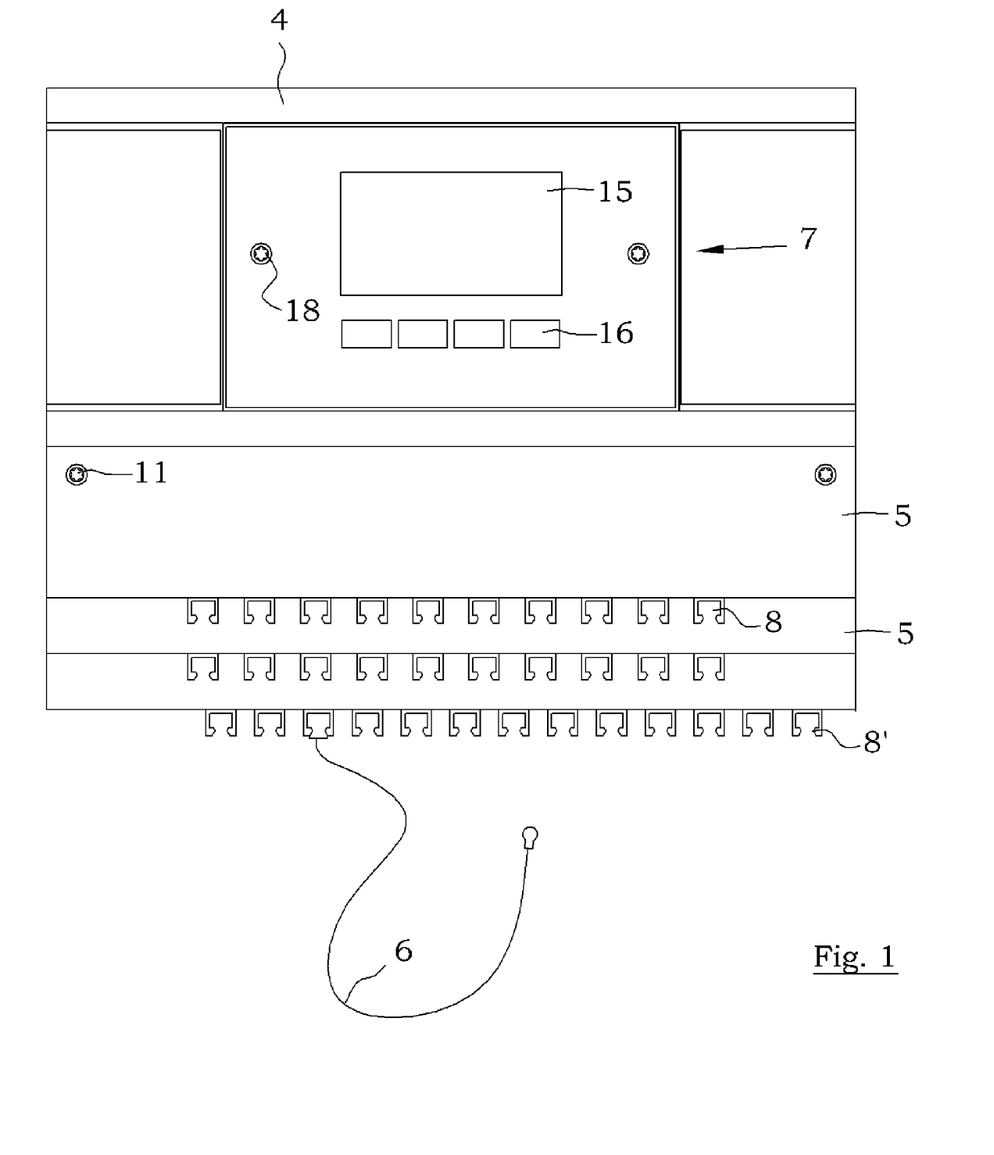
FIG. 1 is a schematic view of the front of an inventive arc monitor.
Figure 2:
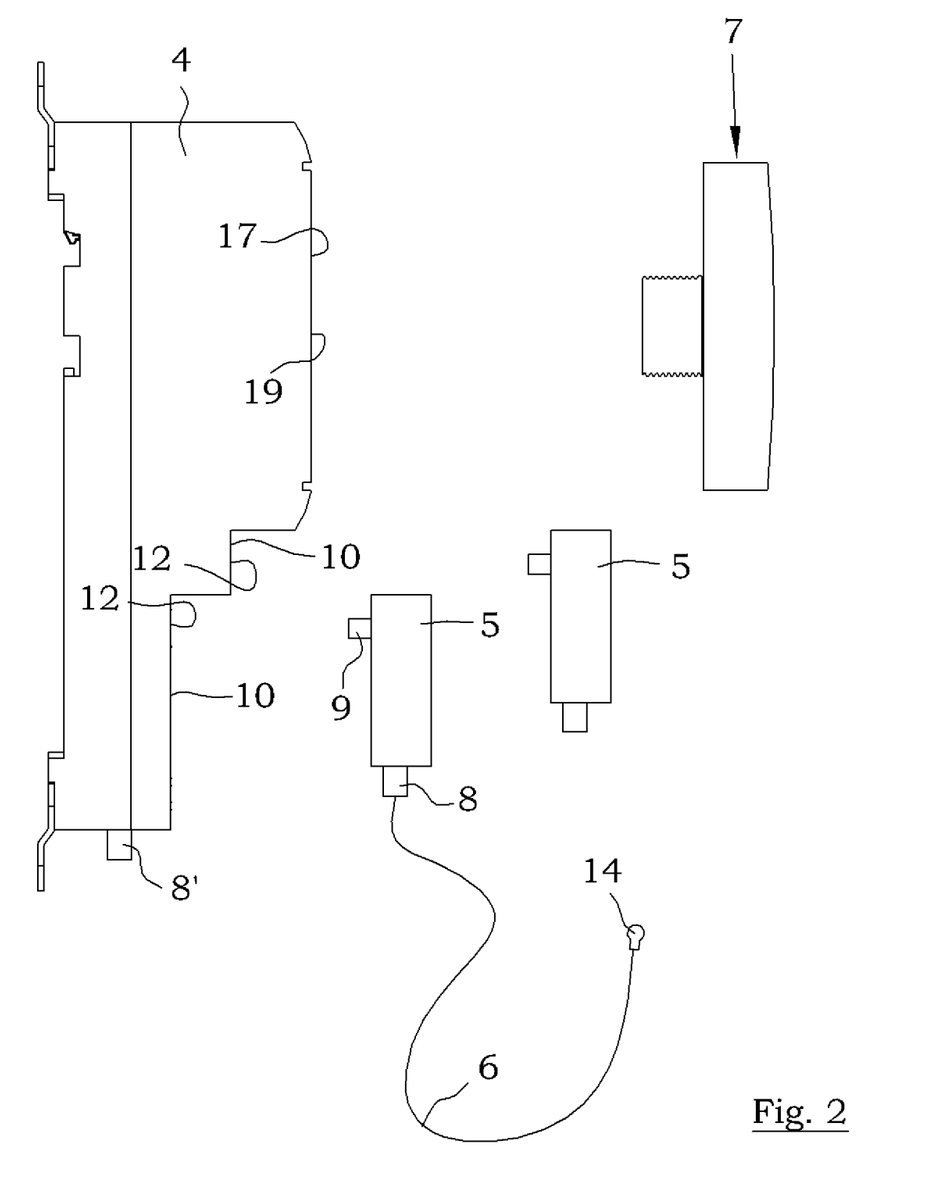
FIG. 2 is a schematic exploded side view of the arc monitor according to FIG. 1.
Figure 3:
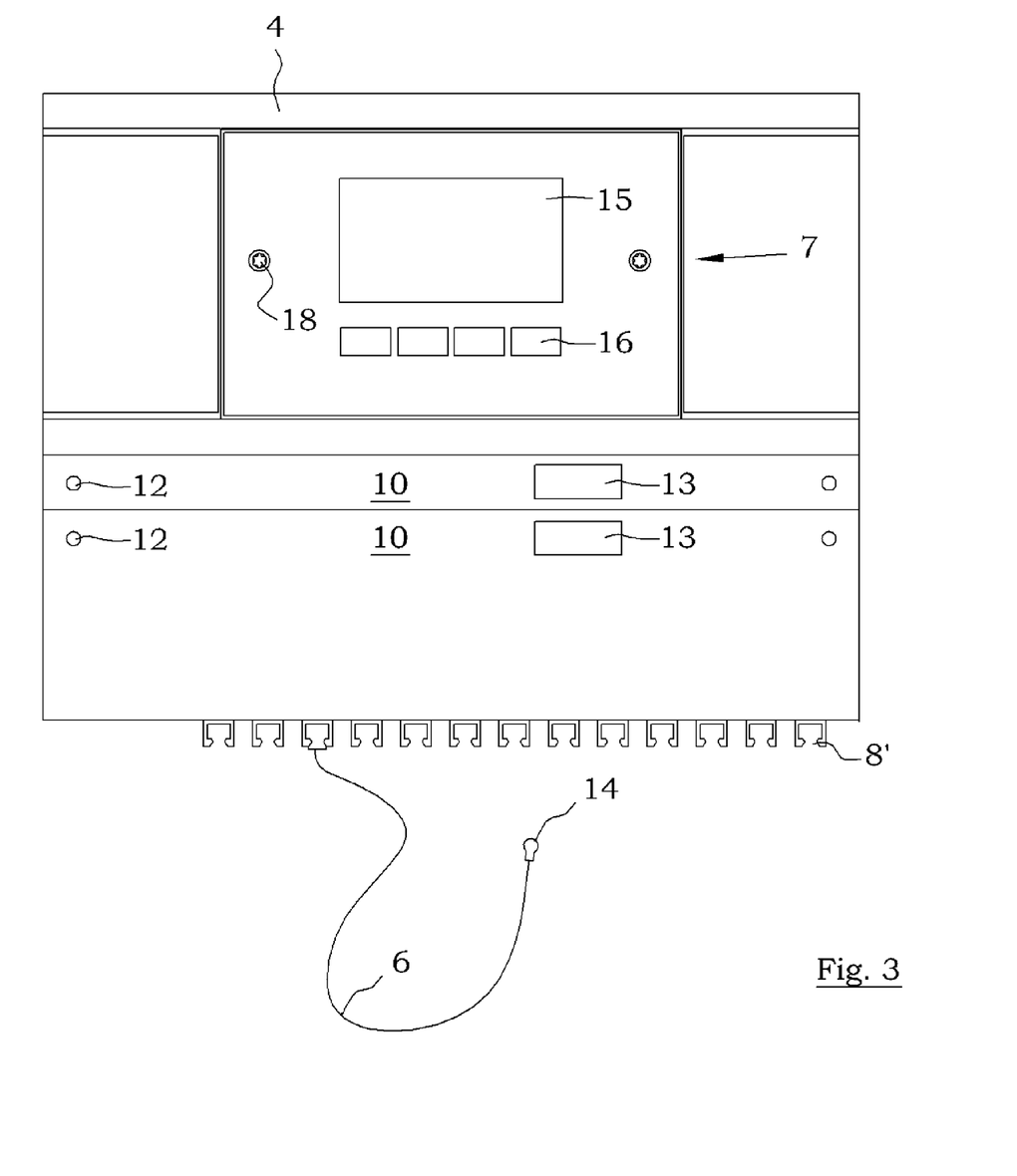
FIG. 3 is a schematic view of the front of the base unit and the control panel of the arc monitor according to FIG. 1.
Figure 4:
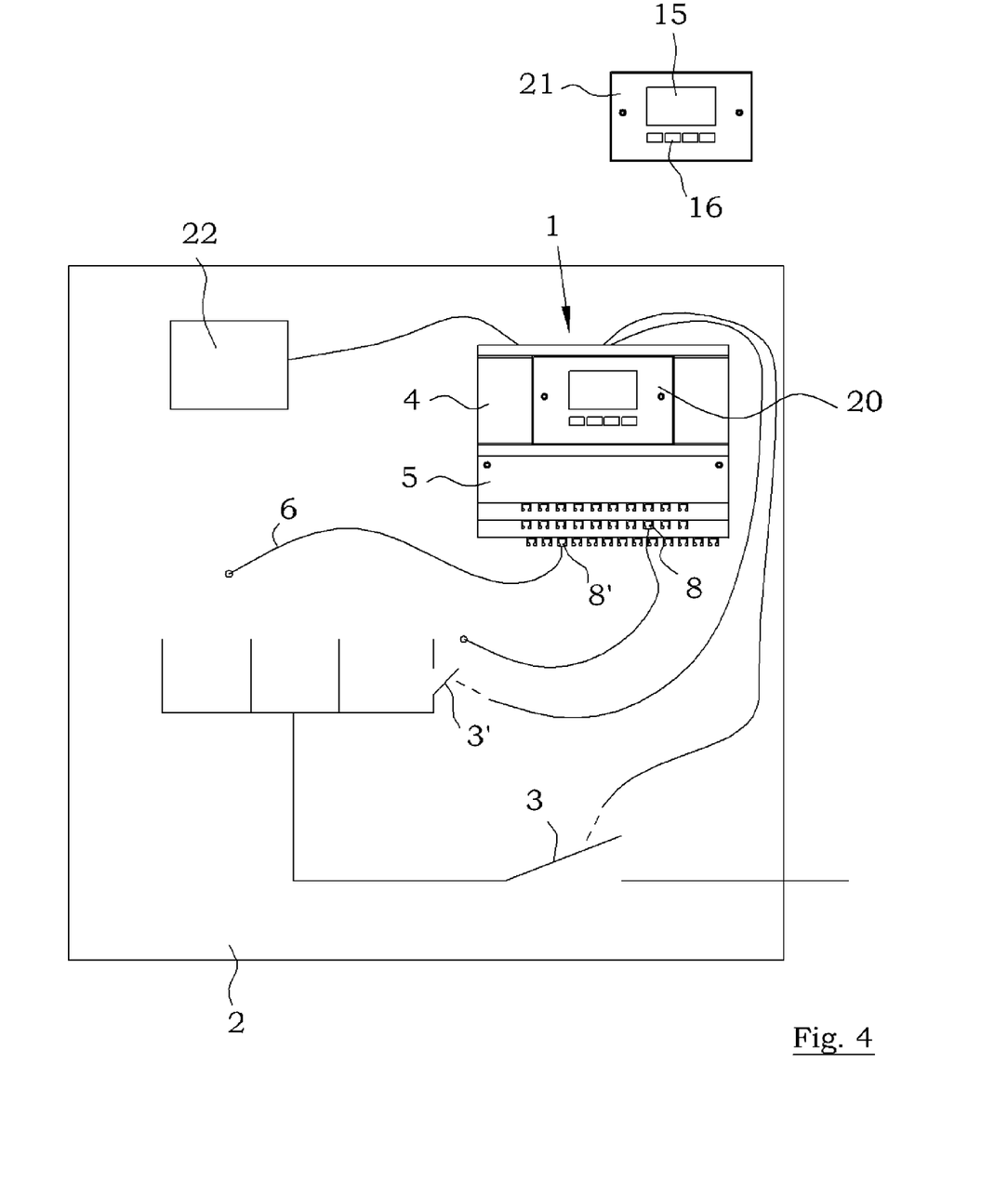
FIG. 4 is a schematic view of an electrical installation comprising the inventive arc monitor.

In the shown embodiment of FIG. 4, the arc monitor 1 comprises at least a first and a second arc detector input terminal 8, 8' and the base unit 4 is arranged to be operatively connected to at least a first and a second circuit breaker 3, 3', the first arc detector input terminal 8 being operatively linked to the first circuit breaker 3', e.g. a sub circuit breaker, and the second arc detector input terminal 8' being operatively linked to the second circuit breaker 3, e.g. the main circuit breaker. It should be pointed out that each arc detector input terminal 8, 8' may be operatively linked to several circuit breakers 3, 3', and several arc detector input terminals 8, 8' may be operatively linked to one circuit breaker 3, 3'.

Each extension unit 5 may be releasably fastened in a seat 10 of the base unit 4, e.g. by means of two screws 11 that are screwed into corresponding holes 12, which may be arranged in position-determining studs of each seat 10. Thus, the extension unit 5 is in that embodiment fitted onto the position-determining studs and thereafter two screws 11 are screwed into said holes 12. When received in the seat 10 the set of output terminals 9 of the extension unit 5 is received in a set of input terminals 13 of the base unit 4. Preferably, each output terminal 9 of the extension unit 5 is received in a corresponding input terminal 13 of the base unit 4, the set of input terminals 13 being connected to the control unit of the base unit 4. The extension unit 5 may also be located remote from the base unit 4, the set of output terminals 9 of the extension unit 5 being operatively connected to the set of input terminals 13 of the base unit 4, e.g. by means of an electric cable. This embodiment may be used if the location that shall be supervised by the arc detectors 6 are located far away from the base unit 4. However, the fastening of the extension unit 5 in the seat 10 of the base unit 4 is preferable, since it is easy to mount and dismount the extension unit 5, e.g. no extra equipment is needed. Thereto, the length of the path of the signals from the extension unit 5 to the control unit of the base unit 4 should be as short as possible, since electrical signals are sensitive for electric noise. Thus, a short electric cable requires less supporting electronic equipment and screens. Thereto, the operator receives a direct visual feedback whether the mounting of the extension unit 5 was successful. The extension units 5 are mounted in the seats 10 which preferably are arranged in a stepwise manner, according to FIG. 2, in order to facilitate the mounting of the extension units 5, and to facilitate the access to the arc detector input terminals 8, 8' of both the extension units 5 and of the base unit 4.

The arc detectors 6 of the arc monitor may be of different types, which detects different physical phenomenon related to an arc occurrence. An arc develops extreme heat, a great pressure pulse, an intense light as well as smoke. Thus, the different types of arc detectors 6 may be arranged to detect a temperature above a predetermined level, or the presence of smoke, or a pressure difference greater than a predetermined amount, or an emitted light above a predetermined intensity. Preferably the arc detectors 6 are optical arc detectors 6. The arc detectors 6 extends from the arc detector input terminals 8, 8' of the extension unit 5 and the base unit 4, respectively, towards a free end thereof. The free end of an optical arc detector 6, is arranged to let light into the optical arc detector 6. Said optical arc detector 6 is arranged to conduct detected light from said free end to the extension unit 5 or the base unit 4. Preferably each optical arc detector 6 comprises an optical cable, preferably a light impermeable optical cable, and a detector head 14, the latter being arranged to detect light from an adjacent area A, which area A preferably is a sector of at least 180°, preferably at least 300°, and reaches a distance up to 3 meters from the detector head 14, seen in any arbitrary plane comprising a prolongation of the axial extension of the free end of the optical arc detector. Thus, said sector is preferably rotary symmetric about the axial extension of the optical arc detector. The other types of arc detectors 6 function in equivalent ways. One and the same extension unit 5 may comprise a set of arc detector input terminals 8 arranged to receive the same type of arc detectors 6, or different types of arc detectors. The specific extension unit 5 is arranged to convert different types of arc detector signals into arc occurrence signals, the latter preferably being of the same type independent on the type of arc detector input terminal 8.

The control unit of the base unit 4 is preferably arranged to detect whether any extension units 5 are connected to the base unit 4, and which type of arc detector input terminals 8 that are present in the specific extension unit 5, and which of the arc detector input terminals 8 that are occupied by an arc detector 6. Alternatively, the operator may manually instruct the control unit of the base unit 4 whether any extension units 5 are operatively connected to the control unit and which arc detector input terminals that are occupied. The operator must instruct the control unit of the base unit 4 which arc detector input terminals 8, 8' are operatively linked to which circuit breakers 3, 3'.

The control panel 7 of the arc monitor 1 is operatively connected to the control unit of the base unit 4. The control panel 7 comprises a display 15 and at least one key 16, e.g. a soft key. In a preferred embodiment the control panel 7 is releasably connected to the base unit 4, as disclosed in FIG. 2, and received in a seat 17. In the shown embodiment, two screws 18 are screwed into corresponding holes 19 of the seat 17. When received in the seat 17 a contact (not shown) of the control panel 7 is connected to a contact (not shown) of the base unit 4. Alternatively, the control panel 7 may be arranged remote from the base unit 4, e.g. accessible from the outside of the electrical installation 2, and is operatively connected to the control unit of the base unit 5 by means of an electric cable, for example. Preferably, the control panel 7 comprises a primary control panel 20 releasably connected to the base unit 4 and a secondary control panel 21 arranged remote from said base unit 4, e.g. accessible from the outside of the electrical installation 2, see FIG. 4. The secondary control panel 21 may be a computer.

By means of the control panel 7 the operator may get access to information about the status of the arc monitor and may input different information to the control unit, as mentioned above.

In a preferred embodiment, according to FIG. 4, the arc monitor 1 has a default operation mode, during which the base unit 4 is arranged to be operatively connected to said at least one circuit breaker 3, 3', and a temporary test mode, during which the base unit 4 is arranged to be operatively disconnected from the at least one circuit breaker 3, 3' for a period of time t less than 100 milliseconds. In addition, the arc monitor 1 comprises an arc detector tester 22 comprising at least one artificial arc emitting means (not shown), e.g. a light emitting means such as a discharge tube, a light emitting diode, or a laser. The arc detector tester 22 shall be arranged in such a way that the arc detector 6 is exposable to an artificial arc emitted from said arc detector tester 22 during the temporary test mode in order to test the function of the arc detector 6. The control unit of the base unit 4 is arranged to examine whether the emitted artificial arc is detected by the at least one arc detector 6 and recorded in said control unit. In addition the control unit of the base unit 4 is arranged to generate an indication whether said artificial arc is recorded or not, which indication is preferably displayed on the display 15 of the control panel 7. The test mode may be initiated according to a schedule, e.g. once a day, or manually by the operator before entering the electrical installation 2.

According to the invention the length of the period of time t is less than 100 milliseconds, preferably less than 75 milliseconds, more preferably less than 50 milliseconds, even more preferably less than 25 milliseconds, and most preferably less than 10 milliseconds, and probably about 7 milliseconds. If a true arc occur at the same time as the period of time t starts or during said period of time t, a trip signal to the circuit breaker 3, 3' will not be send before the period of time t is ended, provided that the true arc still goes on and is detected by the free end of the optical arc detector 6 after the period of time t. The length of the period of time t entail that a true arc has not enough time to develop in extent and discharge enough energy to cause severe damages on different types of components of the electrical installation 2, i.e. cause them to fully degrade, or to cause injuries on personnel. It should be pointed out that the test mode may be active when a true arc causes the arc monitor 1 to trip the circuit breaker 3, 3'. This is the case when the test mode is longer than the period of time t, and said period of time t has not started or has ended. The result of the test may thus be evaluated during the test mode but after the period of time t, during which the arc monitor 1 is operatively disconnected from the circuit breaker 3, 3'.

Thus, the period of time is in a specific case based on the actual arcing current for a specific arc occurrence and the different types of components of the electrical installation 2. The different types of components are made out of materials which will degrade, i.e. catch fire, melt, disintegrate, vaporize, etc., due to discharge of enormous amounts of energy in the event of an arc occurrence. The different types of components are made of metal, such as steel, copper, aluminum, etc., polymers, such as cables, insulating and non-conductive materials, etc., and semi-conducting materials, etc. Thus, for a specific electrical installation 2 the period of time may be adapted to the specific materials and the supply voltage of the electrical installation 2.

Feasible Modifications of the Invention

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and the equivalents thereof. Thus, the arc monitor as well as the electrical installation and the use may be modified in all kinds of ways within the scope of the appended claims.

It shall also be pointed out that even thus it is not explicitly stated that features from a specific embodiment may be combined with features from another embodiment, the combination shall be considered obvious, if the combination is possible.

Throughout this specification and the claims which follows, unless the context requires otherwise, the word "comprise", and variations such as "comprises" or "comprising", will be understood to imply the inclusion of a stated integer or steps or group of integers or steps but not the exclusion of any other integer or step or group of integers or steps.

What is claimed is:

1. An electrical installation comprising:
   at least one circuit breaker; and
   an arc monitor, said arc monitor comprising:
   a base unit having a control unit;
   at least one extension unit, the extension unit having at least one arc detector input terminal, the extension unit being releasably fastened in a seat of the base unit;
   at least one arc detector, the at least one arc detector being connectable to said at least one arc detector input terminal and the at least one arc detector being operatively connected to said at least one circuit breaker;
   wherein the arc monitor is arranged to trip said at least one circuit breaker in the event of an arc occurrence in the electrical installation, and the extension unit is operatively connectable to and arranged to send an arc occurrence signal to said control unit, which is arranged to send a trip signal for tripping said at least one circuit breaker, in the event of an arc occurrence, and wherein the at least one circuit breaker is separate from the base unit and extension unit of the arc monitor, wherein the at least one extension unit includes a first extension unit and a second extension unit arranged in a stepwise manner.

2. The electrical installation of claim 1, wherein the base unit has a seat and the at least one extension unit is mounted in the seat of the base unit.

3. The electrical installation of claim 1, further comprising at least one output terminal, the at least one output terminal received in the at least one arc detector input terminal.

4. An arc monitor for tripping a circuit breaker in the event of an arc occurrence, said arc monitor comprising:
a base unit having a control unit;
at least two extension units including a first extension unit and a second extension unit arranged in a stepwise manner, the at least two extension units having at least one arc detector input terminal and the at least two extension units being releasably fastened in a seat of the base unit; and
at least one arc detector, the at least one arc detector being connectable to said at least one arc detector input terminal and arranged to be operatively connected to at least one circuit breaker, and
wherein the at least two extensions units are operatively connectable to and arranged to send an arc occurrence signal to said control unit, which is arranged to send a trip signal for tripping said at least one circuit breaker, in the event of an arc occurrence.

5. The arc monitor of claim 4, wherein said at least one arc detector detects a physical phenomenon related to an arc occurrence that is different from a physical phenomenon related to an arc occurrence detected by the base unit.

6. The arc monitor of claim 4, wherein at least one of the extension units further comprises a programmable logic circuit arranged to convert an arc detector signal from the at least one arc detector into an arc occurrence signal, said arc occurrence signal being linked to said at least one arc detector input terminal.

7. The arc monitor of claim 4, wherein the control unit of the base unit is arranged to record an arc occurrence signal from at least one of the extension units and to send a trip signal for tripping the at least one circuit breaker operatively linked to the at least one arc detector input terminal, in the event of an arc occurrence.

8. The arc monitor of claim 4, further comprising at least a first arc detector input terminal and a second arc detector input terminal and wherein the base unit is arranged to be operatively connected to at least a first circuit breaker and a second circuit breaker, the first arc detector input terminal being operatively linked to the first circuit breaker and the second arc detector input terminal being operatively linked to the second circuit breaker.

9. The arc monitor of claim 4, wherein the base unit comprises at least one arc detector input terminal of the base unit, to which an arc detector is connected.

10. The arc monitor of claim 9, wherein said arc detector input terminal of the base unit is operatively connected to the control unit, which is arranged to record an arc detector signal from the arc detector and to send a trip signal for tripping the at least one circuit breaker operatively linked to the at least one arc detector input terminal, in the event of an arc occurrence.

11. The arc monitor of claim 4, wherein the at least one arc detector is arranged to detect a temperature above a predetermined level, the presence of smoke, a pressure difference greater than a predetermined amount, or an emitted light above a predetermined intensity.

12. The arc monitor of claim 4, wherein the arc monitor has a default operation mode, during which the base unit is arranged to be operatively connected to said at least one circuit breaker, and a temporary test mode, during which the base unit is arranged to be operatively disconnected from the at least one circuit breaker for a period of time less than 100 milliseconds, the arc monitor comprising the at least one arc detector and an arc detector tester having at least one artificial arc emitting means, the at least one arc detector being exposable to an artificial arc emitted from said arc detector tester during the temporary test mode in order to test the function of the arc detector, wherein the control unit of the base unit is arranged to examine whether the emitted artificial arc is detected by the at least one arc detector and recorded in said control unit.

13. The arc monitor of claim 12, wherein the control unit is arranged to generate an indication whether said artificial arc is recorded or not, which indication is displayed on a control panel operatively connected to the control unit of the base unit.

14. The arc monitor of claim 4, wherein said arc monitor is for use as a supervision and safety equipment in an electrical installation.

15. The arc monitor of claim 4, further comprising at least one output terminal, the at least one output terminal received in the at least one arc detector input terminal.

16. The arc monitor of claim 4, wherein the at least two extension units are operatively connectable to and arranged to send an arc occurrence signal to said control unit, which is arranged to send a trip signal for tripping said at least one circuit breaker, in the event of an arc occurrence.

17. The arc monitor of claim 4, wherein the at least one circuit breaker is separate from the base unit and the at least two extension units of the arc monitor.

18. The arc monitor of claim 4, wherein the arc monitor comprises a control panel operatively connected to the control unit of the base unit.

19. The arc monitor of claim 18, wherein said control panel having a primary control panel releasably connected to the base unit and a secondary control panel arranged remote from said base unit.

20. The arc monitor of claim 19, wherein said control panel comprises a display and at least one key.

21. The arc monitor of claim 4, wherein the arc monitor comprises at least two arc detectors, the at least two arc detectors being connectable to one of said at least two arc detector input terminals and arranged to be operatively connected to the at least one circuit breaker, wherein at least one of said at least two arc detectors detects a physical phenomenon related to an arc occurrence that is different from a physical phenomenon related to an arc occurrence detected by another one of said least two arc detectors.

22. The arc monitor of claim 4, wherein the control unit is arranged to detect whether any extension unit is connected to the base unit, and whether at least one of the at least two extension units is connected to the base unit.

23. The arc monitor of claim 4, wherein the control unit is arranged to detect which type of the at least one arc detector input terminal is included in each respective extension unit.

24. The arc monitor of claim 4, wherein the control unit is arranged to detect if the at least one arc detector input terminal is occupied by said at least one arc detector.

25. The arc monitor of claim 4, wherein the at least one arc detector is an optical arc detector.

26. The arc monitor of claim 25, wherein the at least one arc detector has a free end arranged to let light into the optical arc detector.

27. The arc monitor of claim 26, wherein the at least one arc detector comprises an optical cable and a detector head.

28. The arc monitor of claim 27, wherein the detector head detects light from an adjacent area.

29. The arc monitor of claim 28, wherein the adjacent area reaches a distance up to 3 meters from the detection head in any arbitrary plane comprising a prolongation of the axial extension of the free end of the at least one optical arc detector.

* * * * *